No. 859,090. PATENTED JULY 2, 1907.
E. MAISONGRANDE.
HEADLIGHT FOR VEHICLES.
APPLICATION FILED MAR. 9, 1906.

Witnesses:
Geo. Heinicke,
J. Franke.

Inventor.
Edmond Maisongrande
by G. Dittmar
Attorney

UNITED STATES PATENT OFFICE.

EDMOND MAISONGRANDE, OF ANGERS, FRANCE.

HEADLIGHT FOR VEHICLES.

No. 859,090.

Specification of Letters Patent.

Patented July 2, 1907.

Application filed March 9, 1906. Serial No. 305,192.

*To all whom it may concern:*

Be it known that I, EDMOND MAISONGRANDE, a citizen of the French Republic, residing at Angers, in France, have invented certain new and useful Improvements in Headlights for Vehicles, of which the following is a full, clear, and exact specification.

My invention relates to headlight and other illuminator supports for motor and other vehicles, and is an improvement upon the construction disclosed by my United States application for Letters Patent, filed September 12, 1905, Serial No. 278,130.

The objects of the present invention are to provide improved means whereby the angle may be varied and controlled, through which the headlight can be rotated by the vehicle to which it is attached, to provide simplified means for attaching the ends of the cables to the head-light support and to the steering mechanism and to provide for the conjoint rotation of a plurality of headlights carried by the same vehicle.

My invention therefore consists in the novel construction and combination of parts, substantially as illustrated in the accompanying drawings and as hereinafter described and claimed.

Figure 1:
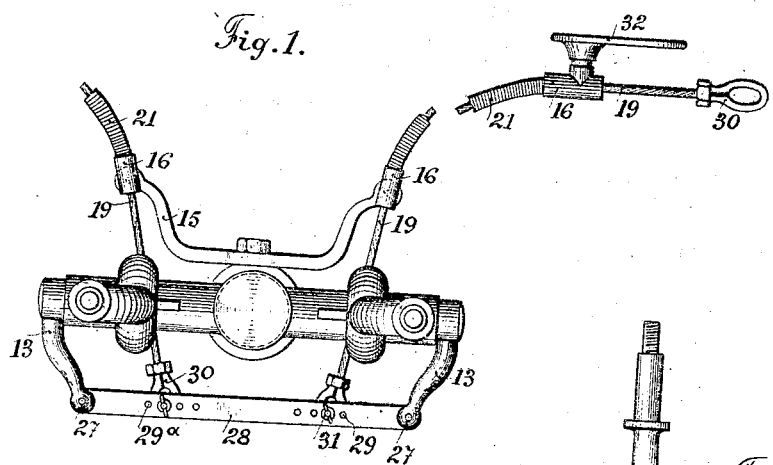
Figure 2:
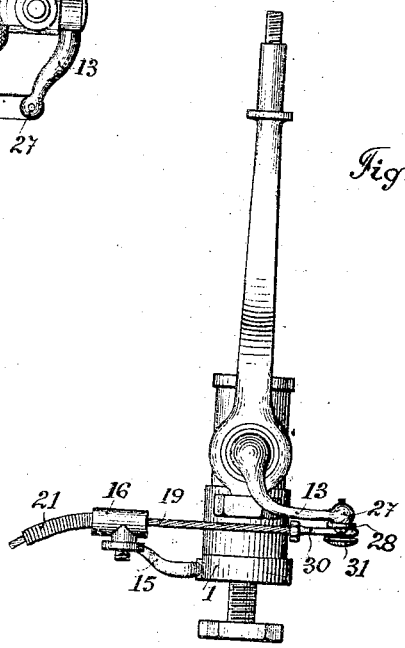
Figure 3:
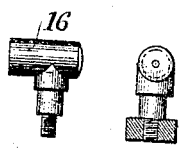
Figure 4:
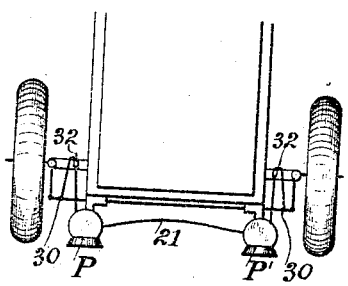

In the accompanying drawings illustrating a preferred form of embodiment of my invention: Figure 1 is a plan view. Fig. 2 is a side elevation. Fig. 3 shows in detail a combined guide for the operating cables and a stop for the covers thereof. Fig. 4 shows the adaption of my invention to two lights mounted upon a vehicle.

The headlight support consists of a fixed lower member 1, adapted to be secured to a fixed part of a vehicle, and of a rotatable section mounted upon the fixed section and provided with horizontally disposed branches. The rotatable section carries the headlight and is provided with a spring (not shown) to insure its positive and prompt return to its normal position when not positively withheld therefrom.

Each horizontal branch of the rotatable member has secured to its outer extremity an arm 13 which projects forward from the branches, and is connected to opposite ends of a bar 28 extending between and connecting the forward extremities 27 of the arm 13. The bar 28 is provided with two series of holes 29 and 29ª. These holes receive removable pins 31, each provided with a head and a screw-threaded shank, which is engaged by a thumb nut after insertion in one of the holes. The pins 31 are engaged by slotted links 30 which are removably secured to operating cables 19, which pass through guides 16 and are secured by links 30, at their ends remote from the bar 28, to suitable portions of the steering mechanism; as illustrated the connection is made to the movable rod connecting the axle levers. The links 30 are formed with split shanks which are tapered and exteriorly screw-threaded and are engaged by nuts, as shown, for the purpose of clamping the splint shanks upon the cable ends.

Each cable passes through two guides, the first attached to a bracket 15, secured to the rear of the fixed member and the second secured to a plate carried by the attachment shackle 32 of the springs. Each guide 16, is formed with a screw threaded shank, and a horizontally disposed, hollow cylindrical member formed with an open end and with a closed end, the latter pierced by an opening for the passage of the cables. The cylindrical portions of the guides 16, receive the ends of outer, non-compressible, flexible cables 21, which enter the guides and abut against their closed ends.

In Fig. 4 I have shown the method of operating two lamps P and P' carried by a vehicle. In this arrangement, only one cable connects each lamp to a movable portion of the steering mechanism; one of these cables being shown at the left hand side of the lamp P, and one at the right hand side of the lamp P'. In this instance the rotary movement of one lamp is communicated to the other by means of a cable 21, which connects the inner and opposite ends of the bars 28 of the lamps.

In the operation of my headlight-support, the upper rotatable section, when not positively withheld by an operating cable from its normal position, is rotated back to that position, by a spring (not shown) contained in the rotatable member.

The present invention makes provision for a variation in the angle through which the lamp will be rotated by the turning of its vehicle. To increase the angle of rotation, the ends of the cables attached to the bar 28 are moved toward the center of that bar; and as the cables must always move through the same distance from a given deflection of the machine, the nearer these ends are to the center of rotation the smaller will be the radius of the curve they describe hence as the radii decrease and length of arc remains the same the greater will be the angle of deflection.

Having thus described my invention what I claim is:

The combination with a headlight support having a fixed section and a movable section mounted to turn on the fixed section, the rotatable section having laterally projecting branches, of arms detachably secured to the branches and projecting forward of the center of rotation of the support, a bar connecting the forward ends of the arms, the bar being provided with a plurality of holes along its length, a bracket secured to the fixed section at the rear of its center of rotation, a hollow guide carried at each end of the bracket, hollow guides secured to suitable portions of the vehicle, flexible covers each seated at one end in a hollow guide carried by the brackets and seated at the other end in a properly disposed hollow guide carried by the vehicle, and cables passing through the guides and covers and comprising a flexible member having removable connections clamped to its ends, one end-connection of each cable being attached to a suitable movable portion of the steering mechanism, and the other end being attached to the bar connecting the arms at one of the holes thereof.

In witness whereof I have hereunto set my hand in presence of two witnesses.

EDMOND MAISONGRANDE.

Witnesses:
 VICTOR PRÉVOST,
 MARCEL VANDER HEEPY.